United States Patent
Hubel et al.

(10) Patent No.: US 9,565,370 B2
(45) Date of Patent: Feb. 7, 2017

(54) SYSTEM AND METHOD FOR ASSISTING IN COMPUTER INTERPRETATION OF SURFACES CARRYING SYMBOLS OR CHARACTERS

(71) Applicant: Apple Inc., Cupertino, CA (US)

(72) Inventors: Paul M. Hubel, Mountain View, CA (US); Todd S. Sachs, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/292,147

(22) Filed: May 30, 2014

(65) Prior Publication Data

US 2015/0350562 A1    Dec. 3, 2015

(51) Int. Cl.

| H04N 5/262 | (2006.01) |
|---|---|
| H04N 5/265 | (2006.01) |
| H04N 5/235 | (2006.01) |
| H04N 5/232 | (2006.01) |
| G06K 9/20 | (2006.01) |
| G06K 9/62 | (2006.01) |

(52) U.S. Cl.
CPC ............ *H04N 5/265* (2013.01); *G06K 9/2036* (2013.01); *G06K 9/6289* (2013.01); *H04N 5/235* (2013.01); *H04N 5/2353* (2013.01); *H04N 5/23245* (2013.01); *G06K 2209/01* (2013.01)

(58) Field of Classification Search
CPC .... H04N 5/265; H04N 5/23245; H04N 5/235; G06K 2209/01
USPC ......................................................... 348/239
See application file for complete search history.

(56) References Cited

U.S. PATENT DOCUMENTS

| 4,845,770 | A | 7/1989 | Koshida |
|---|---|---|---|
| 5,500,905 | A | 3/1996 | Martin |
| 6,520,407 | B1 | 2/2003 | Nieswand |
| 7,499,588 | B2 | 3/2009 | Jacobs |
| 8,118,216 | B2 | 2/2012 | Hoch |
| 8,493,513 | B2 | 7/2013 | Sullivan |
| 8,553,109 | B2 | 10/2013 | Plowman |
| 8,577,145 | B2 | 11/2013 | Panetta |
| 8,620,058 | B2 | 12/2013 | Nepomniachtchi |
| 8,724,924 | B2 | 5/2014 | Nepomniachtchi |
| 8,805,125 | B1 | 8/2014 | Kumar |
| 9,270,899 | B1 * | 2/2016 | Ivanchenko ............. G06K 9/00 |
| 2007/0223582 | A1 | 9/2007 | Borer |

(Continued)

OTHER PUBLICATIONS

Bengio et al., Globally Trained Handwritten Word Recognizer using Spatial Representation Convolutional Neural Networks and Hidden Markov Models, 1994, Advances in Neural Information Processing Systems, pp. 937-944.

(Continued)

*Primary Examiner* — Usman Khan
(74) *Attorney, Agent, or Firm* — Blank Rome LLP (57) ABSTRACT

The present disclosure relates to image processing and analysis and in particular automatic segmentation of identifiable items in an image, for example the segmentation and identification of characters or symbols in an image. Upon user indication, multiple images of a subject are captured and variations between the images are created using lighting, spectral content, angles and other factors. The images are processed together so that characters and symbols may be recognized from the surface of the image subject.

25 Claims, 8 Drawing Sheets

(56) References Cited

U.S. PATENT DOCUMENTS

| | | | |
|---|---|---|---|
| 2008/0310721 A1 | 12/2008 | Yang | |
| 2009/0284613 A1* | 11/2009 | Kim | G06T 5/50 348/222.1 |
| 2010/0008535 A1 | 1/2010 | Abulafia | |
| 2012/0143760 A1 | 6/2012 | Abulafia | |
| 2012/0185393 A1 | 7/2012 | Atsmon | |
| 2012/0284185 A1 | 11/2012 | Mettler | |
| 2013/0004076 A1* | 1/2013 | Koo | G06K 9/228 382/176 |
| 2013/0085935 A1 | 4/2013 | Nepomniachtchi | |
| 2013/0148862 A1 | 6/2013 | Roach | |
| 2013/0202185 A1 | 8/2013 | Irwin | |
| 2013/0265311 A1 | 10/2013 | Na | |
| 2014/0052636 A1 | 2/2014 | Mattes | |
| 2014/0143143 A1 | 5/2014 | Fasoli | |
| 2014/0192210 A1* | 7/2014 | Gervautz | G06K 9/228 348/207.1 |
| 2015/0006362 A1 | 1/2015 | Mitchell | |
| 2015/0347859 A1 | 12/2015 | Dixon | |
| 2015/0347860 A1 | 12/2015 | Meier | |
| 2015/0347861 A1 | 12/2015 | Doepke | |

OTHER PUBLICATIONS

Ciresan, et al., "Multi-column Deep Nueral Networks for Image Classification," IDSIA, Technical Report No. IDSIA-04-12, Feb. 2012, 20 pages.

Deng et al., Error-Correcting Output Coding for the Convolutional Neural Network for Optical Character Recognition, 2009, 10th International Conference on Document Analysis and Recognition, pp. 581-585.

Graves, "Supervised Sequence Labelling with Recurrent Neural Networks," vol. 385 of Studies in Computational Intelligence, Springer, 2012, 124 pages.

Graves, et. al., "Connectionist Temporal Classification: Labelling Unsegmented Sequence Data with Recurrent Neural Networks," IDSIA, 2006, 8 pages.

K. Datta, "Credit Card Processing Using Cell Phone Images," Stanford University, 2011-2012, Retrieved from: https://stacks.stanford.edu/file/druid:yj296hj2790/Datta_Credit_card_processing_using_cell_phone.pdf.

LeCun, et al., "Gradient-Based Learning Applied to Document Recognition," Proceedings of the IEEE, 86(Nov. 11, 1998, 46 pages.

Pascanu, et al., "On the difficulty of training Recurrent Neural Networks," in ICML (3), 2013, 12 pages.

Patrice Y. Simard, Dave Steinkraus, John Platt, "Best Practices for Convolutional Neural Networks Applied to Visual Document Analysis," International Conference on Document Analysis and Recognition (ICDAR), IEEE Computer Society, Los Alamitos, pp. 958-962, 2003.

Schambach, et al., "Stabilize Sequence Learning with Recurrent Neural Networks by Forced Alignment," 2013 12th International Conference on Document Analysis and Recognition (ICDAR), IEEE Computer Society, pp. 1300-1304, 2013.

Graves, et al., "Speech recognition with deep recurrent neural networks," IEEE Conference on Acoustics, Speech and Signal Process (ICASSP), 2013.

He, Pan, et al., "Reading scene text in deep convolutional sequences," arXiv preprint arXiv:1506.04395 (2015).

Shi, Baoguang, et al., "An end-to-end trainable neural network for image-based sequence recognition and its application to scene text recognition," arXiv prepring arXiv:1507.05717 (2015).

Song, William, and Jim Cai, End-to-End Deep Neural Network for Automatic Speech Recognition, 2015.

Su, Bolan, and Shijian Lu, "Accurate scene text recognition based on recurrent neural network," Computer Vision—ACCV 2014, Springer International Publishing, pp. 35-48.

Su, Bolan, et al., "Segmented handwritten text recognition with recurrent neural network classifiers," 13th International Conference on Document Analysis and Recognition (ICDAR), IEEE, 2015.

Yousfi, Sonia, et al., "Deep learning and recurrent connectionist-based approaches for Arabic text recognition in videos," 13th International Conference on Document Analysis and Recognition (ICDAR), IEEE, 2015.

* cited by examiner

SYSTEM AND METHOD FOR ASSISTING IN COMPUTER INTERPRETATION OF SURFACES CARRYING SYMBOLS OR CHARACTERS

BACKGROUND

The advent of portable integrated computing devices has caused a wide proliferation of cameras. These integrated computing devices commonly take the form of smartphones or tablets and typically include general purpose computers, cameras, sophisticated user interfaces including touch sensitive screens, and wireless communications abilities through WiFi, LTE, HSDPA and other cell-based or wireless technologies. The wide proliferation of these integrated devices provides opportunities to use the devices' capabilities to perform tasks that would otherwise require dedicated hardware and software. For example, as noted above, integrated devices such as smartphones and tablets typically have one or two embedded cameras. These cameras generally amount to lens/camera hardware modules that may be controlled through the general purpose computer using downloadable software (e.g., "Apps") and a user interface including the touch-screen fixed buttons and touchless control such as voice control.

One opportunity for using the features of an integrated device is to capture and evaluate images. The resident camera allows the capture of one or more images and the general purpose computer provides processing power to perform analysis. In addition, any analysis that is preferred for a network service computer can be facilitated by simply transmitting the image data or other data to a service computer (e.g., a server, a website, or other network-accessible computer) by using the communications capabilities of the device.

These abilities of integrated devices allow for recreational, commercial and transactional uses of images and image analysis. For example, images may be captured and analyzed to decipher information from the images such as characters and symbols. The characters and symbols may be transmitted over a network for any useful purpose such as for use in a game, or a database, or as part of a transaction such as a credit card transaction. For these reasons and others, it is useful to enhance the abilities of these integrated devices and other devices for deciphering information from images.

SUMMARY

Some images contain characters or other decipherable symbols that could be useful if those characters or symbols were directly accessed by a computer in the manner that, for example, an ASCII character may be accessed. Some embodiments of this disclosure seek to enhance a computer's ability to gain direct access to characters or symbols visibly embodied in images. Further, by using an integrated device, such as a smartphone or tablet, a user may capture an image, have the image processed to decipher characters, and use the deciphered information in a transaction.

One example of using an integrated device as described is to capture an image of an object having raised or embossed characters, such as a typical credit card. Some embodiments of this disclosure provide for a user initiating a process on an integrated device by activating an application or by choosing a feature within an application to begin a transaction. Upon this user prompt, the device may display a user interface that allows the user to initiate an image capture or that automatically initiates an image capture, the subject of the image being of an object having raised or embossed characters, such as a credit card. In some embodiments, upon the user's indication the device captures multiple images of the subject. In order to help decipher the characters or symbols visible in the subject, it is desirable to have variations between the captured images. The variations may be exploited in processing to make the characters and/or symbols more decipherable or prominent.

Differing embodiments of this disclosure may employ one or all of several techniques to create a variance between captured images. For example, lighting conditions may vary between images by using one or more artificial lights such as flashes, or by not using a flash at all. In order to change lighting conditions, some embodiments may also involve varying the exposure length or the intensity of a flash. Of course, there are other ways to create variance between images such as by varying the spectral content of artificial lighting or changing the angle of incidence for the light.

Once a collection of two or more varying images are assembled, the images may be combined by known linear or non-linear methods and the combination image may accentuate the appearance of characters and symbols. Depending upon the number of varying images captured, combinations of several images may be used to improve the results. After a satisfactory final combined image is created, an analysis may be made (e.g., optical character recognition) to recover a set of machine-readable characters from the image. Once the characters are in machine-readable form, they may be easily employed by other software to play games, populate databases or perform transactions, such as credit card transactions.

DETAILED DESCRIPTION

The inventive embodiments described herein may have implication and use in all types of cameras and in single and multi-processor computing systems. The discussion herein references a common computing configuration having a CPU resource including one or more microprocessors. The discussion is only for illustration and not intended to confine the application of the invention to the disclosed hardware. Other systems having either other known or common hardware configurations are fully contemplated and expected. With that caveat, a typical hardware and software operating environment is discussed below. The hardware configuration may be found, for example, in camera devices, a phone or any computing device such as a portable computing device comprising a phone and a camera.

Figure 1:
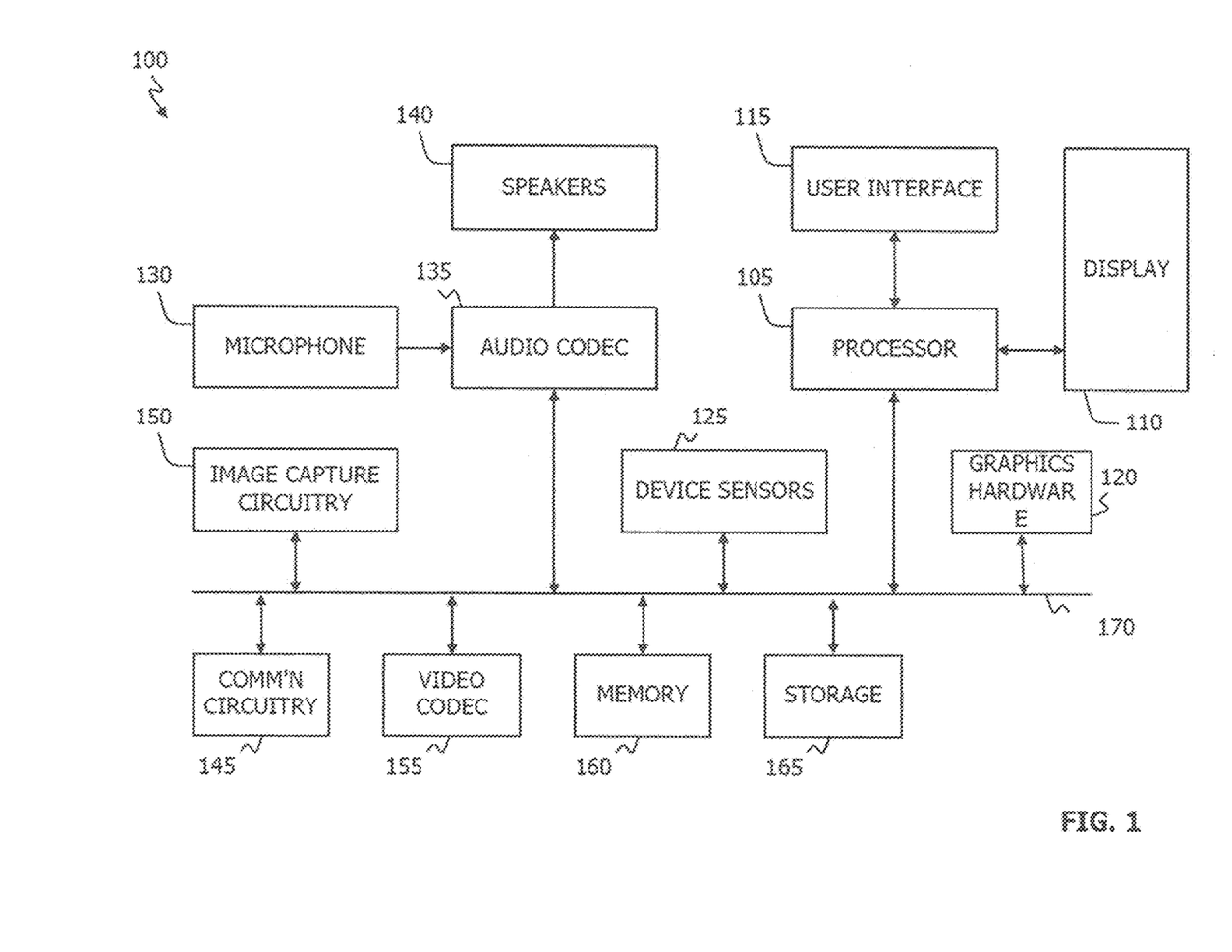
FIG. 1 is a block diagram of an illustrative hardware device.

Referring to FIG. 1, a simplified functional block diagram of illustrative electronic device 100 is shown according to one embodiment. Electronic device 100 could be, for example, a mobile telephone, personal media device, portable camera, or a tablet, notebook or desktop computer system or even a server. As shown, electronic device 100 may include processor 105, display 110, user interface 115, graphics hardware 120, device sensors 125 (e.g., proximity sensor/ambient light sensor, accelerometer and/or gyroscope), microphone 130, audio codec(s) 135, speaker(s) 140, communications circuitry 145, digital image capture unit 150, video codec(s) 155, memory 160, storage 165, and communications bus 170. Communications circuitry 145 may include one or more chip sets for enabling cell based communications (e.g., LTE, CDMA, GSM, HSDPA, etc.) or other communications (WiFi, Bluetooth, USB, Thunderbolt, Firewire, etc.). Electronic device 100 may be, for example, a personal digital assistant (PDA), personal music player, a mobile telephone, or a notebook, laptop, tablet computer system, or any desirable combination of the foregoing.

Processor 105 may execute instructions necessary to carry out or control the operation of many functions performed by device 100 (e.g., such as the generation and/or processing and/or evaluation and analysis of media such as images). In general, many of the functions described herein are based upon a microprocessor acting upon software (instructions) embodying the function. Processor 105 may, for instance, drive display 110 and receive user input from user interface 115. User interface 115 can take a variety of forms, such as a button, keypad, dial, a click wheel, keyboard, display screen and/or a touch screen, or even a microphone or camera (video and/or still) to capture and interpret input sound/voice or images including video. The user interface 115 may capture user input for any purpose including for use as images or instructions to capture images or instructions to the system for any other function.

Processor 105 may be a system-on-chip such as those found in mobile devices and include a dedicated graphics processing unit (GPU). Processor 105 may be based on reduced instruction-set computer (RISC) or complex instruction-set computer (CISC) architectures or any other suitable architecture and may include one or more processing cores. Graphics hardware 120 may be special purpose computational hardware for processing graphics and/or assisting processor 105 to process graphics information. In one embodiment, graphics hardware 120 may include one or more programmable graphics processing units (GPU).

Sensor and camera circuitry 150 may capture still and video images that may be processed to generate images for any purpose including to be analyzed for characters and symbols in accordance with the teachings herein. Output from camera circuitry 150 may be processed, at least in part, by video codec(s) 155 and/or processor 105 and/or graphics hardware 120, and/or a dedicated image processing unit incorporated within circuitry 150. Images so captured may be stored in memory 160 and/or storage 165 and/or in any storage accessible on an attached network. Memory 160 may include one or more different types of media used by processor 105, graphics hardware 120, and image capture circuitry 150 to perform device functions. For example, memory 160 may include memory cache, electrically erasable memory (e.g., flash), read-only memory (ROM), and/or random access memory (RAM). Storage 165 may store media (e.g., audio, image and video files), computer program instructions or other software including database applications, preference information, device profile information, and any other suitable data. Storage 165 may include one more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 160 and storage 165 may be used to retain computer program instructions or code organized into one or more modules and written in any desired computer programming language. When executed by, for example, processor 105 such computer program code may implement one or more of the method steps or functions described herein.

Figure 2:
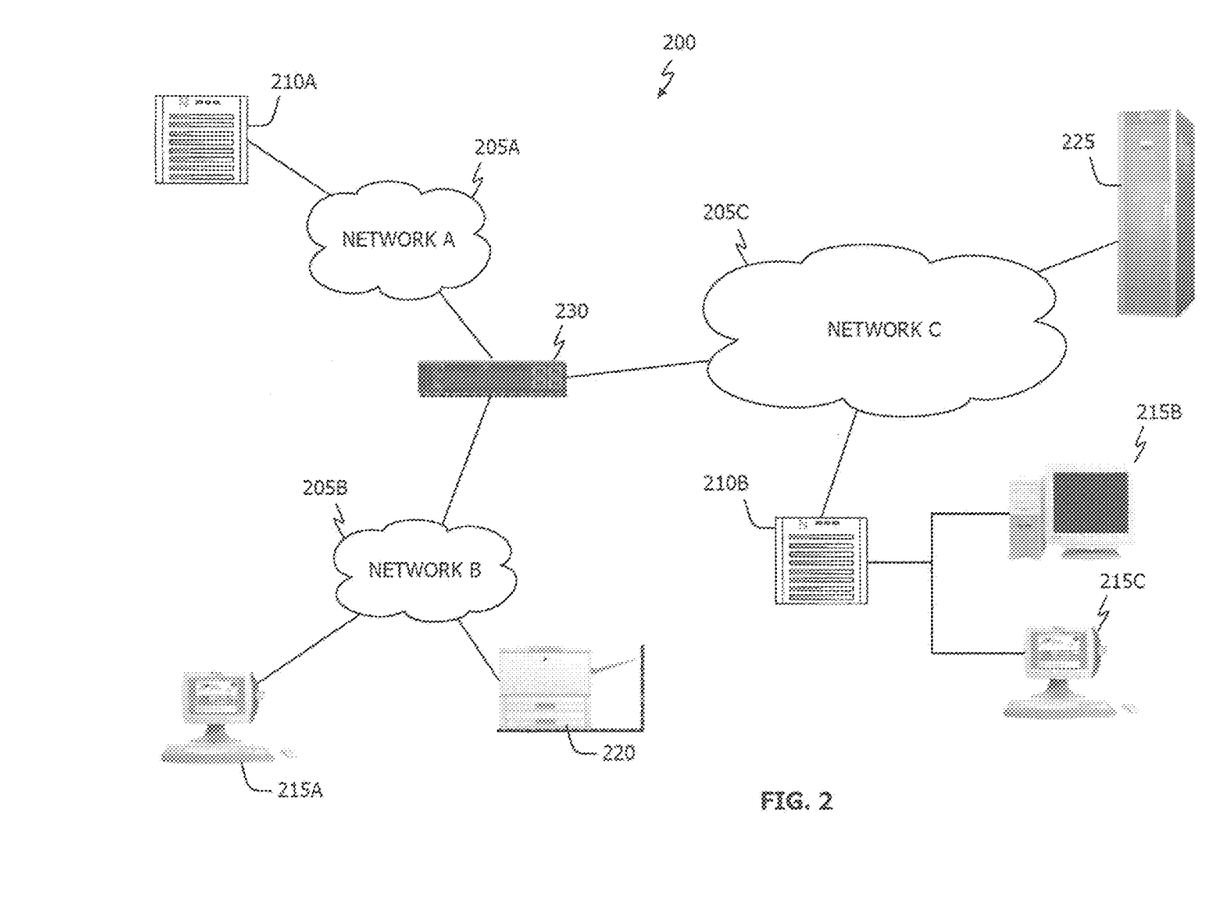
FIG. 2 is a system diagram illustrating a potential network environment.

Referring now to FIG. 2, illustrative network architecture 200 within which the disclosed techniques may be implemented includes a plurality of networks 205, (i.e., 205A, 205B and 205C), each of which may take any form including, but not limited to, a local area network (LAN) or a wide area network (WAN) such as the Internet. Further, networks 205 may use any desired technology (wired, wireless or a combination thereof) and protocol (e.g., transmission control protocol, TCP). Coupled to networks 205 are data server computers 210 (i.e., 210A and 210B) that are capable of operating server applications such as databases and also capable of communicating over networks 205. One embodiment using server computers may involve the operation of one or more central systems to collect, process, and distribute information to and from mobile computing devices, such as smart phones or network connected tablets.

Also coupled to networks 205, and/or data server computers 210, are client computers 215 (i.e., 215A, 215B and 215C), which may take the form of any computer, set top box, entertainment device, communications device or intelligent machine, including embedded systems. In some embodiments, users will employ client computers in the form of smart phones or tablets. Also, in some embodiments, network architecture 210 may also include network printers such as printer 220 and storage systems such as 225, which may be used to store multi-media items (e.g., images) that are referenced herein. To facilitate communication between different network devices (e.g., data servers 210, end-user computers 215, network printer 220 and storage system 225), at least one gateway or router 230 may be optionally coupled there between. Furthermore, in order to facilitate such communication, each device employing the network may comprise a network adapter. For example, if an Ethernet network is desired for communication, each participating device must have an Ethernet adapter or embedded Ethernet capable ICs. Further, the devices must carry network adapters for any network in which they will participate.

As noted above, embodiments of the inventions disclosed herein include software. As such, a general description of common computing software architecture is provided as expressed in layer diagrams of FIG. 3. Like the hardware examples, the software architecture discussed here is not intended to be exclusive in any way but rather illustrative. This is especially true for layer-type diagrams, which software developers tend to express in somewhat differing ways. In this case, the description begins with layers starting with the O/S kernel so lower level software and firmware has been omitted from the illustration but not from the intended embodiments. The notation employed here is generally intended to imply that software elements shown in a layer use resources from the layers below and provide services to layers above. However, in practice, all components of a particular software element may not behave entirely in that manner.

Figure 3:
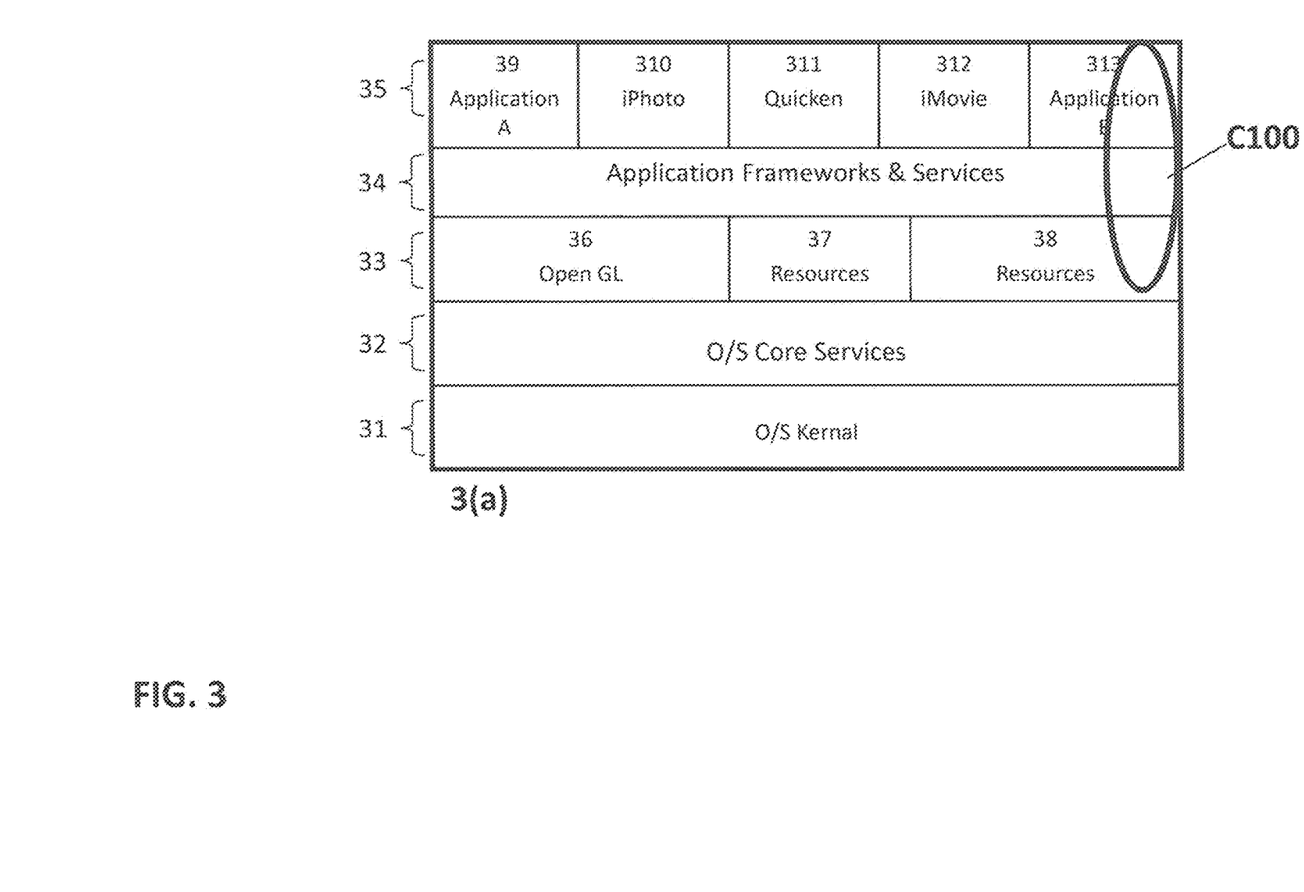
FIG. 3 is layer diagram illustrating a potential organization of software components.

With those caveats regarding software, referring to FIG. 3A, layer 31 is the O/S kernel, which provides core O/S functions in a protected environment. Above the O/S kernel, there is layer 32 O/S core services, which extends functional services to the layers above such as disk and communications access. Layer 33 is inserted to show the general relative positioning of the Open GL library and similar resources. Layer 34 is an amalgamation of functions typically expressed as multiple layers: applications frameworks and application services. For purposes of our discussion, these layers provide high-level and often functional support for application programs which reside in the highest layer shown here as item 35. Item C100 is intended to show the general relative positioning of the software including any client side software described for some of the embodiments of the current invention. While the ingenuity of any particular software developer might place the functions of the software described at any place in the software stack, the software hereinafter described is generally envisioned as user facing (e.g., in a user application) for some embodiments and/or as a resource for user facing applications to employ functionality related to image analysis as discussed below for other embodiments. On the server side, certain embodiments described herein may be implemented using server application level software, database software, either possibly including frameworks and a variety of resource modules.

No limitation is intended by these hardware and software descriptions and the varying embodiments of the inventions herein may include any manner of computing device such as Macs, PCs, PDAs, phones, servers or even embedded systems.

Most types of photography depend upon illumination of the subject matter. Illumination may be a result of the ambient light in the environment of the photo's subject (e.g., background illumination) or light that is artificially created for the purpose of supporting the photographic process. This type of artificial light is typically produced by a flash device that projects light on a subject in a timed interval that coordinates with the capture of an image. For example, in traditional photography, the light interval is timed to correspond with the opening of the camera shutter.

Whether the lighting present for image capture comes from ambient conditions or artificially, the physical characteristics of the illumination may have an effect on the characteristics of the captured image. For example, since a flash originates from a predictable source, the specular reflection is also more predictable and typically has greater magnitude than the ambient lighting otherwise would produce. In addition, light may be characterized by its frequency along a spectrum of increasing wavelength spanning from at least as low as 100 nanometer light (invisible ultraviolet light), to 400 nanometers (e.g., visible violet light), through much of the visible spectrum to 700 nanometers (e.g., visible red light), and going higher to 1000 nanometers or more (e.g., invisible infrared light). The frequency or spectral characteristics of light correlates with many properties of light such as its transmission characteristics and propensity for reflection off a given surface. For example, ultraviolet light moves through air without a significantly scattering (e.g., it does not reflect significantly off typical molecules present in air), while infrared light scatters significantly, in a relative sense.

The light captured in an image may also vary according to the intensity of ambient or artificial light on the image subject. While higher light intensity is likely to result in a brighter image, it also contributes to more dramatic changes in the image at places such as edges and bumps, where the reflection of light off the subject varies. For example, in areas of the subject having an edge or a bump, the contour of the edge or bump causes the deflection of light to vary across the feature. If the edge or bump feature is captured in multiple images using multiple increasing light intensities, the images will differ in the areas surrounding the featured due to the variance of deflections caused by the contours. For example, an image may reveal more or less contrast around an edge or a bump depending upon the intensity of the flash. The phenomena described here may also apply to image features other than bumps and edges. For example, an image of a laser-printed document will exhibit varying specular reflection from the toner depending upon the amount of light and incidence of light on the document.

The amount of light captured with an image also depends upon the duration of the exposure (the time interval over which the image is captured). Long exposure times capture more light, while short exposure times capture less light. Similar to the situation with light intensity, the amount of light captured during an exposure will alter the captured image in the areas that surround contours in the subject, such as the areas surrounding features like a bump or an edge.

Whatever the extent of illumination during an image capture, the light captured by a camera is the portion of light that reflects off the subject. That reflected light may be used to capture an image on film, or in the case of most embodiments, the reflected light is captured by an imager such as a CMOS or CCD image sensor. The visible qualities of the captured image varies with relation to the properties of the reflected light that becomes incident on the image sensor. For example, the visible qualities of the captured image depend upon incident light characteristics such as angle, spectral characteristics, intensity, etc. Furthermore, the surface properties of the subject affect at least the amount and direction of light reflection, so visible image also depends upon the subject's surface contour, reflectivity, etc. For example, surface contour such as raised letters or embossed designs may block some light leaving shadows of different size, intensity and nature, depending upon the light and the material properties of the subject. In addition, the specular reflection may vary depending upon the features on surface of the photographed item (such as the laser printer toner issue discussed above). The existence of shadows and other phenomena caused by the variation of lighting striking a surface such as a contoured surface can aid the digital analysis of the surface image by providing information about the surface contour or surface features. While this is true with respect to any three-dimensional subject or variably reflective surface, a desire for analysis of surface contours and other phenomena may be greater when the surface contours or phenomena encode and/or reveal information. For example, evaluation of contours and other phenomena may help computers identify objects in satellite images. Alternatively, contours may be used to more accurately assess characters and/or symbols embossed or raised in materials such as business cards or credit cards.

The recovery of symbols and characters from various surfaces can be very useful with respect to business and commerce. One potential common example is to use one or more simple photo of a credit card to enable a transaction such as a purchase or to enable capture and retention of the credit card information. The ease of this type of transaction is enhanced by the use of an integrated computing device, like a smartphone, that has a camera to capture images, a computer to process and analyze the images, and various communications ports to execute the transaction over a network. Many embodiments of this disclosure envision the use of such a smartphone or similar integrated devices such as a tablet or a watch that has a camera, a programmable computer and ability to communicate with a network such as the Internet.

Figure 4:
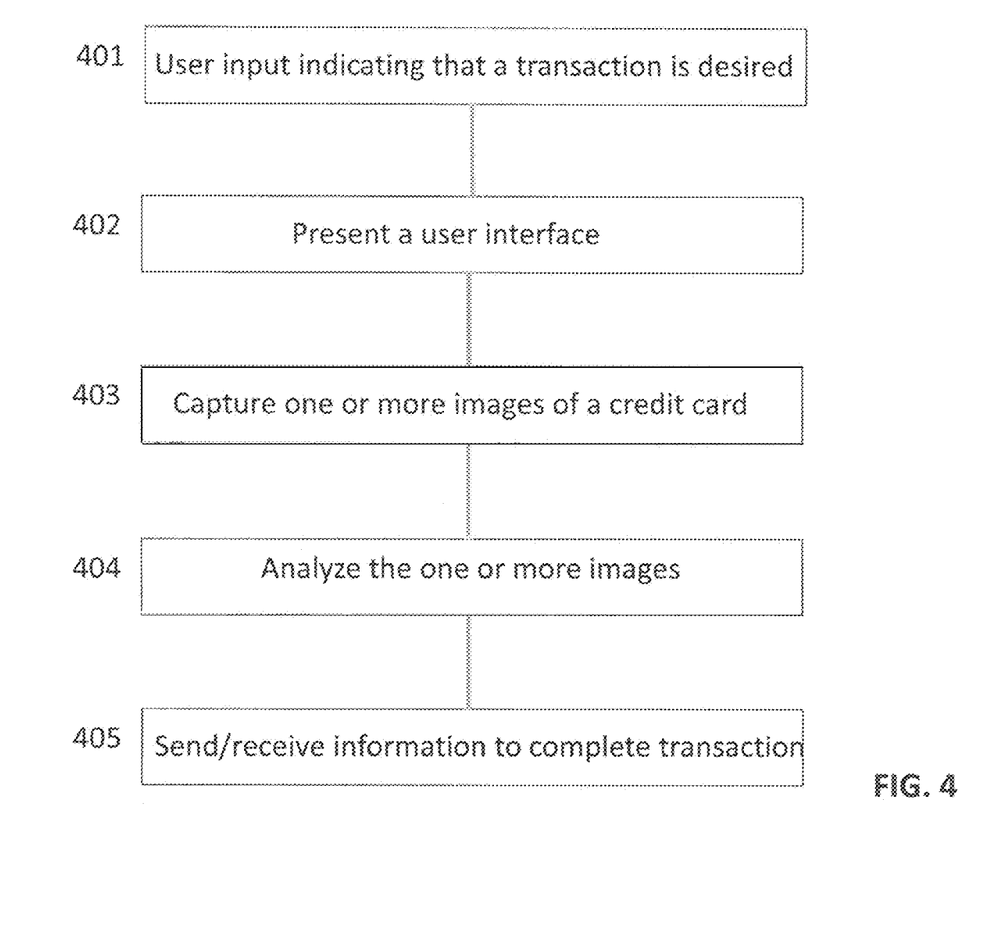
FIG. 4 shows a process illustrating certain embodiments of the disclosure.

With reference to FIG. 4, a computer-implemented process is shown for using an integrated device such as a smart phone for executing a credit card transaction. The process may begin at 401 with receipt of a user request that indicates the user desires to commence a credit card transaction. While this step may occur in any known way, in some embodiments the user may be a sales person or retail employee that indicates the desire for a transaction by selecting an application to run or selecting (within an application) an option to start a new transaction. The process continues at 402 where the device responds to the user input by presenting a user interface for capturing an image of the credit card. In some embodiments this interface may be an ordinary camera interface, while in other embodiments the system may present a specialized interface. A specialized interface may include a camera screen that is shape-appropriate for a credit card and/or instructions that guide the user to orient the card in a specified fashion that may be dynamically monitored prior to image capture. Any appropriate interface will suffice as long as it allows the capture of an image of the credit card. Differing embodiments allow for initiating the image capture in a variety of ways, including for example, by a user's touch input, a user's voice command, according to a timer, or as indicated by an automatic analysis (i.e., the camera takes the picture when the system perceives the credit card is in an appropriate position and the lens sufficiently in focus). Next, at 403, one or more images are captured of the credit card. As discussed later, the images may be captured both with and without artificial light (i.e., a flash) and potentially using light of differing spectrums and intensities, as well as artificial light having varying angles of incidence upon the subject. After images are captured, they may be analyzed at 404, for example using a resident processing resource such as a GPU and/or a CPU. Further, in some embodiments, the images or information about the images may be sent to a server for analysis by using the integrated device's communications capability. Thus, the results of the analysis may be computed or received by the device and the process may continue. In some embodiments, during analysis 404, any information necessary to complete the transaction should be deciphered from the images or requested from the user. For example, the system may use a GUI to request that the user obtain an authorizing signature or code, which can be compared to any signature or code captured in one or more of the images. Finally, at 405, the system may use the gathered and interpreted information to complete a transaction by sending and receiving the necessary information to a service computer on a network that may be accessed by using a data connection such as WiFi, LTE or HSDPA+.

In order to aid in the interpretation of symbols or characters represented in the contours of a surface such as a credit card, some embodiments of the invention capture multiple images that may be combined or otherwise analyzed to interpret the information revealed or encoded in the contours (or other reflective phenomena). In one or more embodiments, a user interface will receive input prompting an integrated device to capture an image. In response to the prompt, the device may capture more than one discrete image. The image capture system of the device may create variance between the images by: using or not using a primary flash controlled by the device; using or not using one or more additional flashes or light sources under control of the device or integral with the device; varying the spectral content of a flash or artificial light (e.g., by selecting a flash or controlling the artificial light source to produce the desired spectral content); varying the exposure length between images; varying the intensity of flash or artificial light on the subject; and, to the extent possible, varying the angle that ambient or artificial light strikes the subject.

Figure 5:
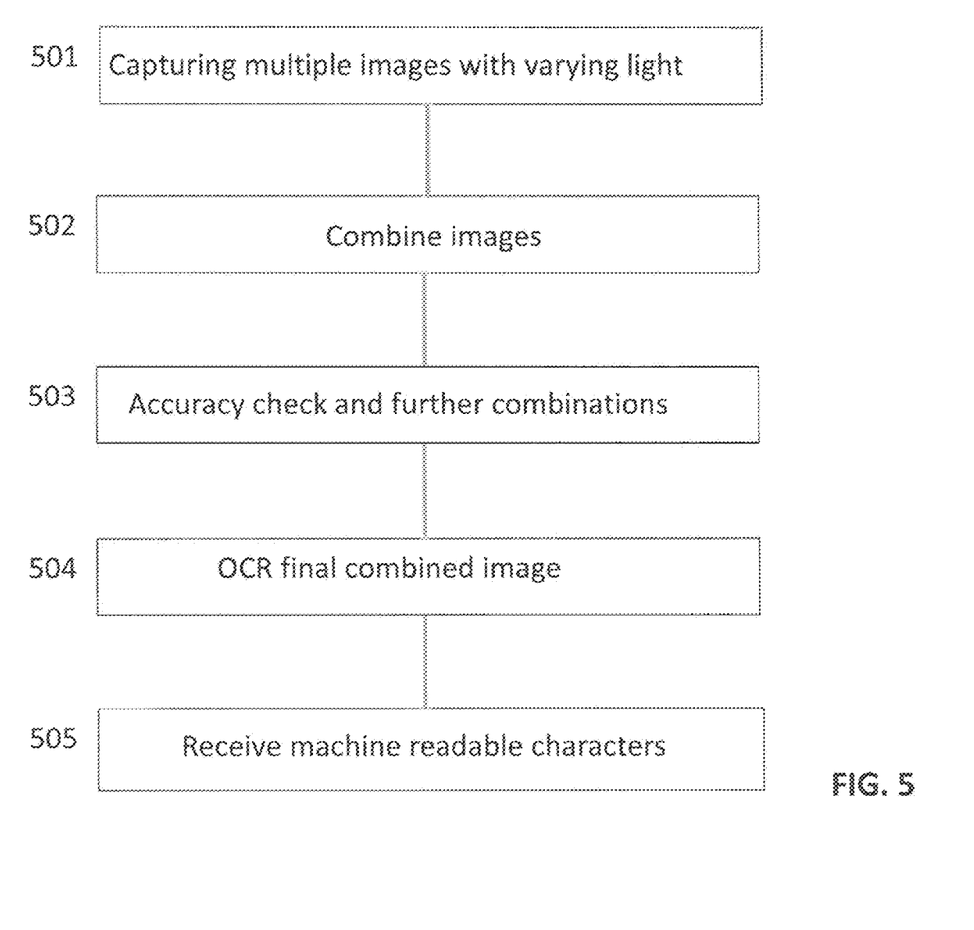
FIG. 5 shows another process illustrating certain embodiments of the disclosure.

By way of illustration, FIG. 5 shows an exemplary process for capturing and analyzing an image of a credit card in order to decipher the characters and symbols on the card, including particularly the raised or embossed characters. The process shown in FIG. 5 may be used as part of a larger process of a transaction such as the process shown in FIG. 4. Initially, at 501, some embodiments call for capturing multiple images of the same credit card surface. Given the capability of contemporary camera, dozens of images or more may be captured very quickly and in response to a single user input. The user need not know that multiple images are taken. Embodiments of this disclosure call for capturing images that may have variances as described above. In some embodiments, at least one of the images is captured in the prevailing ambient lighting and at least another one of the images is captured using a flash controlled by the device that may or may not be integral with the device. Given the differences between the non-flash and flash images, the pictures will exhibit differing phenomena surrounding the raised or embossed characters and/or symbols. The differences between the flash and non-flash images will be more acute if the source of ambient light (in the non-flash image(s)) is not directionally aligned with the artificial light caused by the flash (in the flash image(s)). In either event, when the images are combined at 502, the raised or embossed characters or symbols should be more prominent and decipherable in the combined image than in either of the original flash or non-flash images. Depending upon the embodiment, one, the other, or both of the flash and non-flash images may be pre-processed or filtered prior to the act of combining. The purpose of the pre-processing or filtering, if desired, would be to prepare the images for combination and/or to accentuate the features of the raised or embossed characters. Furthermore, in some embodiments the images may be combined through a difference quotient (e.g., $f(x+h)-f(x))/h)$), while in other embodiments, the combinations may take various other linear or non-linear forms, such as subtraction, addition or other forms of division or any form of blending that accentuates the raised or embossed areas of the images.

After combining the flash and non-flash images, some embodiments of the process may include an accuracy check 503. The accuracy check generally involves making an assessment regarding whether the raised or embossed symbols and/or characters are sufficiently decipherable in the current version of the combined image. One way to perform an accuracy check is to submit the current version of the combined image to an OCR engine or other software designed to decipher characters and/or symbols. As a result of the OCR engine's work, a set of machine-encoded computer readable characters is created that represent the characters captured in the submitted version of the combined image. Another product of the OCR engine may be information regarding the confidence of the OCR process. This type of confidence information may be in the form of direct information, where the OCR engine reveals the identity of characters that are more certainly accurate or that may be inaccurate. Alternatively, information regarding the confidence of the OCR result may be gleaned from metadata from the OCR process. However confidence information is obtained, the process at 503 may use the information to determine if further image combinations may be desirable in order to enhance the prominence and decipherability of the characters or symbols present in the combined image. In some embodiments, confidence information that falls under a threshold will result in creating more image combinations. For example, if version 1 of the combined image was submitted to OCR, but the accuracy confidence is low, then one or more other images may be combined with version 1 to create version 2 of the combined image. Version 2 of the combined image may then be submitted to OCR and the cycle may be repeated depending upon the confidence that the OCR data is correct. The number of cycles may be infinite or it may be limited to a pre-determined fixed number or to the number of varying images or image combinations available to combine.

Confidence information from the OCR engine may be replaced or augmented by information learned during the sequential submission of image versions to an OCR engine. For example, for each combined image version submitted to OCR in sequence, there will be a corresponding machine readable character set. If sequential character sets are consistent (or becoming more consistent), better accuracy in indicated. If sequential character sets are becoming less consistent, then inaccuracy is indicated. In addition, the accuracy of the OCR process may be considered and enhanced by supplying the OCR engine (e.g. software) with information about the submitted images, such as lighting or contrast.

As mentioned above, during the accuracy check, some embodiments make subsequent image combinations using images other than the original flash and non-flash images (recall that at 501 many images may be captured having varying properties). In these embodiments, the following types of images may be combined in attempts to yield more prominent and decipherable characters: flash images having different exposure lengths; non-flash images having different exposure lengths; flash images captured with a spectrally different flash; images that are pre-processed differently; images having widely separate capture times (over a few hundred milliseconds); flash images captured using a flash of differing intensities; or any combination of the foregoing variances as well as other known image variances, including the image variances discussed elsewhere in this disclosure.

In lieu of or in addition to combining new images for accuracy check 503, the system my attempt to enhance accuracy by changing the combination math, for example from division to subtraction or from one type of division to another type of division. The change from one type of mathematical combination to another may enhance the prominence and decipherability of the characters, which may be verified by OCR confidence or by assessing whether sequential OCR results are consistent.

Yet another technique for potential use during accuracy check 503 is to use different OCR engines and assess confidence based upon agreement. Since embodiments of the invention allow for using a local OCR engine or a remotely accessible service, a great variety of software may be accessed for the accuracy check.

Referring again to FIG. 5, either after combining images at 502 or after accuracy has been checked and/or enhanced at 503, a resulting image may be submitted to OCR at 504 to determine the final set of machine readable characters. As indicated above, the OCR engine may be run locally on the image capture device or may be accessed over a network using the communications capabilities of the device. In addition, the parameters regarding the submitted image may be used to tune the OCR process. For example, the OCR engine may be tuned or adapted based upon the lighting of the image or other factors known about the image.

Finally, at 504 the machine readable characters are received and may be employed in transactions (e.g., at a point of sale) or otherwise.

As discussed above, in some embodiments image variations may include images where the angle of light incident on the image subject varies from one image to another. For example, with respect to process descriptions associated with 403 of FIGS. 4 and 501 of FIG. 5, some embodiments of this disclosure may capture multiple images of a surface in a relatively short time interval. One way to create useful variance between the images is to alter the angle of an artificial light (such as a flash) with respect to the subject. The image variance caused by the angle of light incidence may be used independent of other variation factors (i.e., holding other variance factors discussed above constant). In addition, however, the angle-related variance may be used in conjunction with other variance factors (i.e., using multiple angles, and for each angle capturing multiple images that reflect changes to one or more of the other variance characteristics discussed above). By using angle-related variance, embodiments of the disclosure benefit from both another type of variance that may help increase character prominence, and a greater number of overall variations that increases potential image combinations available.

Figure 6:
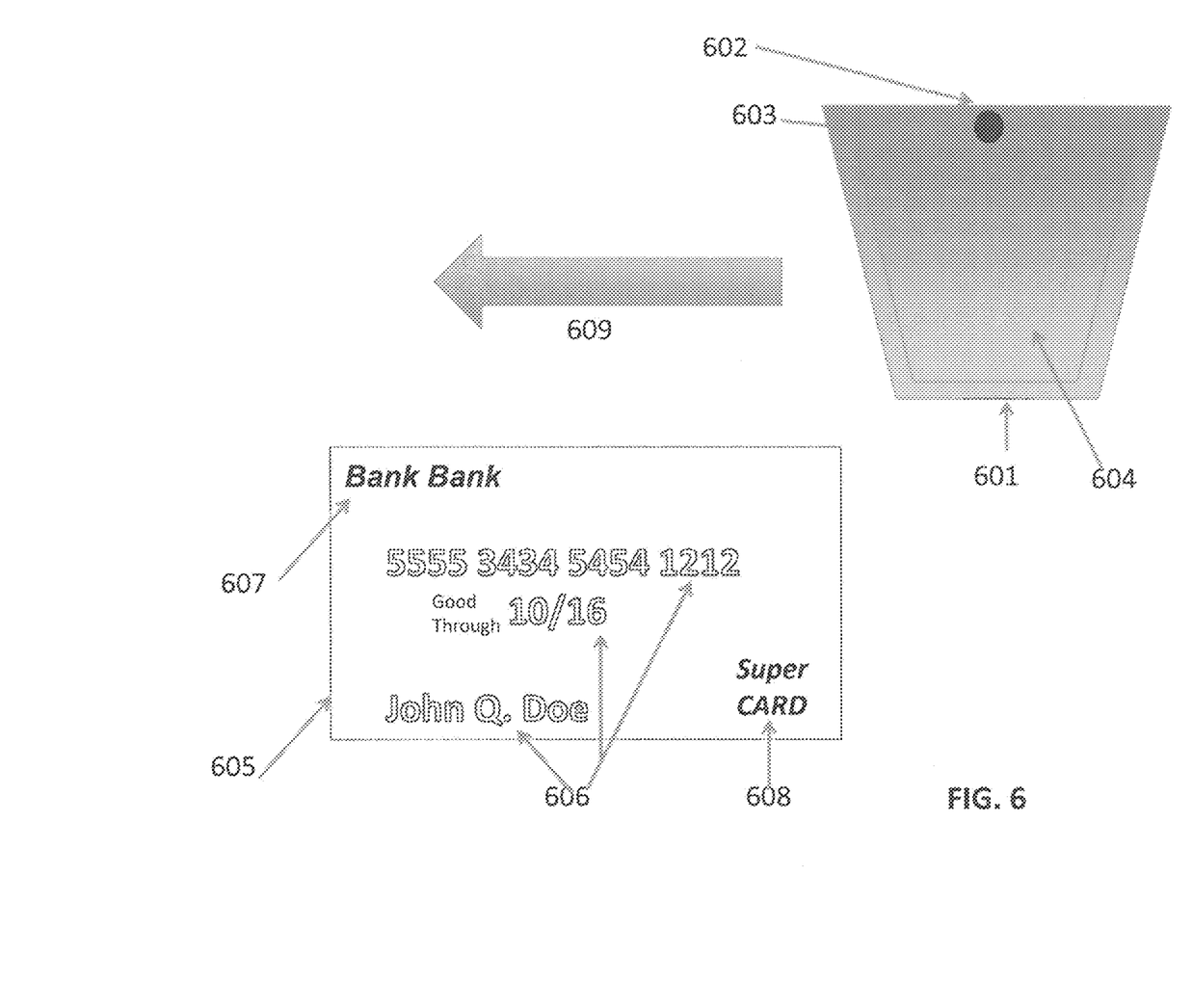
FIG. 6 is an illustration of certain embodiments where an integrated device captures an image of a subject such as a credit card.

There are a number of ways to achieve image variation related to the angle of incident light. In some embodiments, the camera (alone or part of an integrated device) may be moved with respect to the subject. For example, FIG. 6 illustrates embodiments that call for this type of movement. Referring to FIG. 6, integrated device 601 is equipped with camera 602 and flash 603 for capturing images. Flash 603 may have multiple light sources or a programmable light source to vary spectral content of the light or subtly vary the angle of projected light with respect to the subject. The illustration of FIG. 6 shows display and/or touch screen 604 on the same side of the device as the camera 602. Alternative embodiments may use an ordinary camera or a camera mounted on an integrated device on a side of the device without a screen FIG. 6 also illustrates credit card 605 having embossed or raised characters 606, a brand logo 608 and an issuing bank logo 607. In some embodiments of the disclosure, images having angle variations with respect to the subject (credit card) can be captured by moving the camera over the credit card 605 as indicated by arrow 609. The movement contemplated by certain embodiments is in the nature of panning a camera, for example, similar to capturing a panoramic image. Of course, since the purpose of the movement is to create angles in incident light, the movement may occur in multiple directions to create more shadowing around the raised or embossed portions 606. In addition, many embodiments involving movement will employ the flash to create incident light rays.

Some embodiments exploiting movement of the device may be accompanied by a user interface that directs the movement of the device with arrows and other indications on the face of the screen in order to direct a user how to move the device. Some of these embodiments may use a rear-facing camera (on the side of the device away from the screen) so the user can view the screen while a camera is pointed toward the credit card or other subject. Furthermore, the integrated device may perform accuracy checks (described above) or other analysis during the user's movement and direct the user's movement according to the results of the accuracy checks.

In addition, with respect to embodiments that employ movement, some of those embodiments may take advantage of the nature movement of a user's hand holding the camera or the subject (even when a user does not intend to move). In this respect, images having capture times most separated from each other are likely to show the most movement. For example, if images are captured over a 500 millisecond period, the first and the last image are likely to embody slightly different perspectives of the subject due to natural shaking of the user's hands. This natural movement may be used to create varying images based upon the angle of light incidence.

Finally, with respect to the embodiments employing movement, the subject (e.g., credit card) can be moved with respect to the device and the same techniques may be employed as described. One consideration relating to moving the subject is that any time the subject will be hand held, stability is not assured as compared to laying the subject on a support or connecting it to a support. Whether or not movement will be employed, if the subject is handheld, sensors in the device may be used to direct a user's orientation of the subject, for example to prevent or correct rotation of the subject about an axis, which results in the face of the subject becoming non-parallel to the XY axis of the image (e.g., when the XY axis of the subject surface is at an angle to the XY axis of the image). One exemplary sensor capability of some cameras may be used to help detect this subject rotation so that it may be corrected. Some camera systems (including those in integrated devices such as the Apple iPhone) have points where the depth of the subject object is estimated (i.e., focus points). Using the depth estimates associated with focus points, the device can determine if parts of a credit card (or other subject) are closer to the camera than other parts, indicating a rotation of the subject as discussed. The information may be employed either to cause the user to re-orient the subject or it may be supplied to the OCR engine so that compensation may be applied for the rotation. Similarly, if the user is holding the integrated device, sensors such as an accelerometer and a magnetometer may be employed to determine if the subject (e.g., credit card) is tilted with respect to the camera. The accelerometer, magnetometer or other sensor information may also be used to cause user correction (through a UI) or supply information to the OCR engine.

Figure 6B:
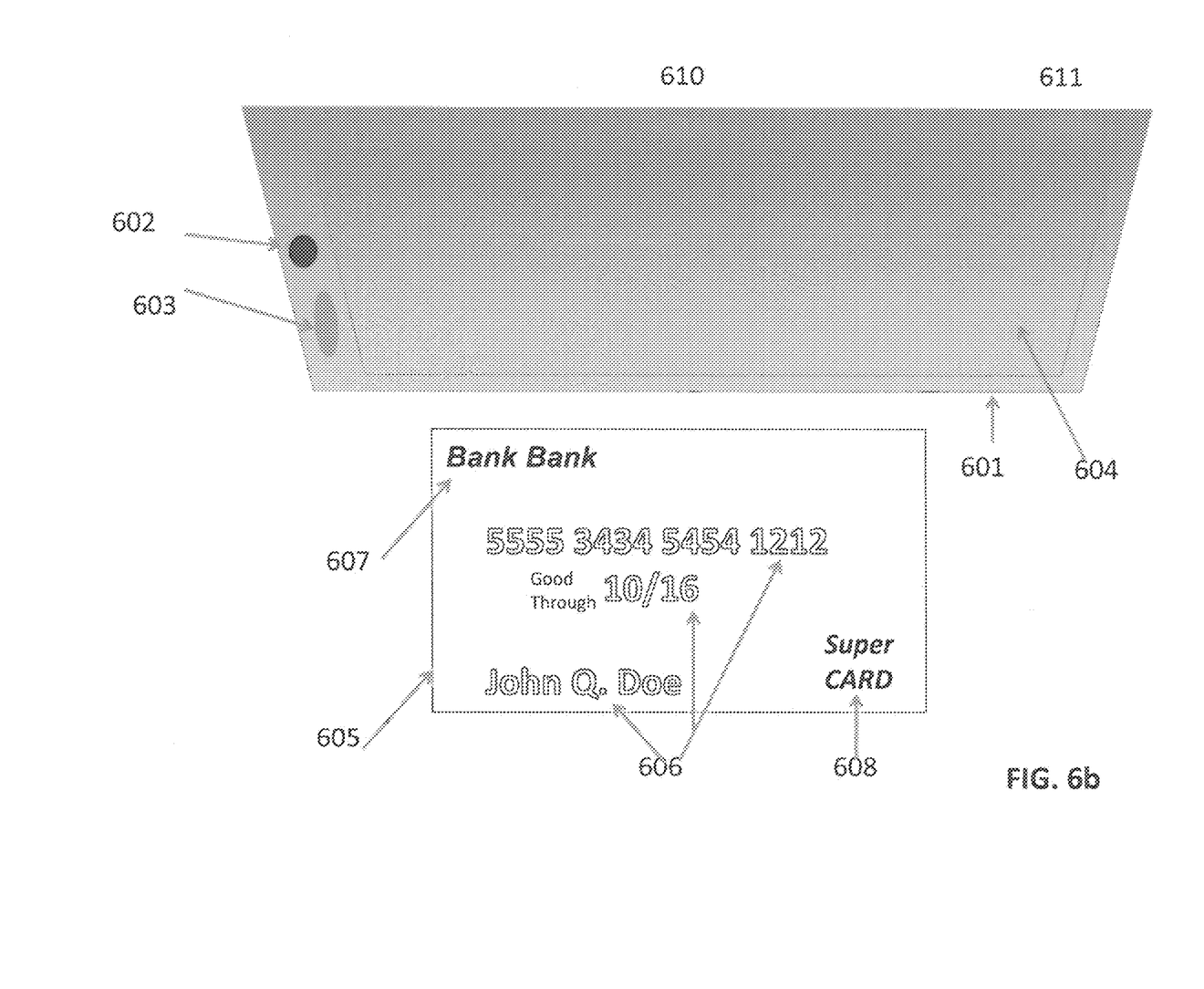
FIG. 6B is another illustration of certain embodiments where an integrated device captures an image of a subject such as a credit card.

In some embodiments, angle-related image variance may be created by using multiple flashes or artificial lights. FIG. 6B illustrates embodiments that call for multiple flashes. Referring to FIG. 6B, integrated device 601 is equipped with camera 602 and flashes 603, 610 and 611. The flashes are illustrated separated from each other to emphasize the concept of creating different angles of incidence on the subject credit card 605. The particular locations illustrated for the flashes are merely illustrative and any locations that create varying angles with respect to a subject are suitable for these embodiments. The flashes may employ the same spectral characteristics, in which case they would be activated separately (in time). Alternatively, some flashes could have unique spectral characteristics, which would allow for activating all the lights simultaneously.

In addition, one or more of the flashes 603, 610 and 611 may contain multiple light sources or a programmable light source to vary spectral content of the light or subtly vary the angle of projected light with respect to the subject. As with FIG. 6, the illustration of FIG. 6B shows display and/or touch screen 604 on the same side of the device as the camera 602. Alternative embodiments may use an ordinary camera or a camera mounted on an integrated device on a side of the device without a screen.

Figure 6C:
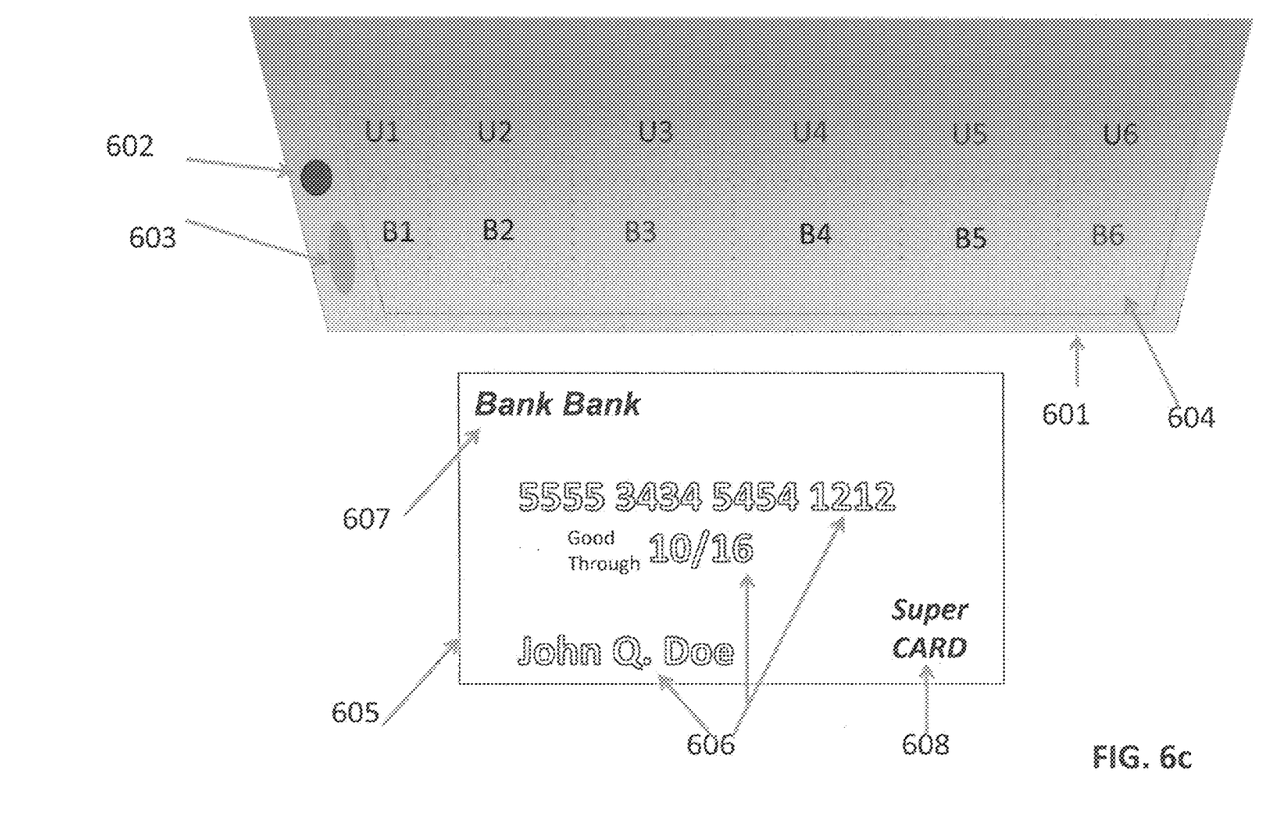
FIG. 6C is another illustration of certain embodiments where an integrated device captures an image of a subject such as a credit card.

With reference to FIG. 6C, the screen 604 of integrated device 601 is, for illustration purposes, labeled with region indicators U1 through U6 on the upper portion of the screen and B1 through B6 on the lower portion of the screen. Since the projection of the screen can be controlled at the pixel level, which is far smaller than the regions shown, different regions of the screen may be used for artificially illuminating the credit card subject from different angles. For example, region U1 may be illuminated (i.e., acting like a flash) for one image (all other regions showing black) and region B6 may be illuminated for another image. Using this technique, the screen may be sectioned in as many regions as desired and the artificial illumination (i.e., flash effect) may be created using one region at a time or groups of regions. In addition, since most integrated devices have screens with a sizable spectral range, by using the screen regions for illumination, the spectral characteristics of each image may be controlled and varied according to programmatic specification. Depending upon the abilities of the screen, the benefits of spectral difference may be significant (whether or not used with an embodiment employing screen regions). For example, light on the IR side of the spectrum doesn't refract in air very much while light toward the ultraviolet side refracts in air greatly by comparison.

Of course the concept of regionally illuminating the screen to vary angle of incidence may be combined with the other concepts herein in order to create greater variance between images or a greater number of varying images. Finally, the flash 602 may be used in connection (separately or simultaneously) with regional screen illumination to create greater variance from image to image.

Some embodiments of the disclosure associate new metadata with the captured images in order to retain all information bearing on image variations. For example, in addition to ordinary photographic metadata such as flash intensity and exposure time, the metadata may include: spectral information regarding the use of artificial light; information regarding the number of images captured and their temporal relationships; information regarding light regions used; and any other information related to the techniques described herein.

Some embodiments of the disclosure seek to more automate the processes discussed with respect to FIGS. 4 and 5 by attempting to recognize the subject object. There are many commercially available routines to perform this type of recognition and it may be accomplished at a geometric level by detecting the edges of an object and evaluating its shape (and potentially size) to determine if it is a credit card, business card, check, etc. Once the subject is identified, the information may be employed for multiple beneficial purposes. For example, the software can know where to expect characters and whether the characters are likely numbers, letters or symbols. In addition, by identifying the subject, the software can know to ignore or de-rate the importance of information outside of the subject, which both simplifies processing and improves accuracy. If the identification routine is accurate enough to determine a type of credit card, the overall accuracy may be more greatly improved and even non-embossed or non-raised information becomes easier to interpret.

Regarding the embodiments relating to reading credit cards and/or processing credit card information, some embodiments of the disclosure attempt to read information that is not encoded in contours (e.g., trade names, holograms, security codes and any other indicia that is visibly ascertainable on the credit card's surface). This information can be used to identify the card and in turn can contribute to the analysis of the image information. In addition, some embodiments use sensors of an integrated device and its network capability to infer information; such as address or zip code (inferred from location of the device and/or a network look-up of the name on the device) and non-embossed indicia (like the security code).

When capturing and/or processing a credit card, some embodiments present a user interface guiding the user on the orientation of the card in the frame of the picture. For example, a user interface may employ brackets or other indicia that a user can manipulate to tell the system more particularly the location of the credit card in the frame. The same use of user-movable indicia may be employed to identify a field on the card, such as the name, credit card number or expiration date. By using this information in the identification and OCR process, the accuracy of the results may be improved. In addition, for some embodiments, it is generally more desirable to perform these operations without the need of user assistance. With respect to those embodiments, the user interface to prompt user assistance may be reserved for situations where accuracy is in doubt.

The discussions herein are intended for illustration and not limitation regarding the concepts disclosed. For example, while much of the discussion herein regards interpreting information encoded in contours, the inventions apply equally to information encoded in other surface phenomena that the techniques of the invention may exploit to decipher information. Unless expressly stated as such, none of the foregoing comments are intended as unequivocal statements limiting the meaning of any known term or the application of any concept.

What is claimed is:

1. A method comprising the acts of:
receiving a user request through a user interface of a general purpose computer;
capturing, in response to the user request, a first image of a first surface under a first set of lighting conditions, the first surface having three dimensions, wherein aspects of the first and second dimensions define at least two boundaries of the first surface and aspects of the third dimension encode raised character information;
storing the first image in a memory resource;
capturing, also in response to the user request, a second image of the first surface under a second set of lighting conditions;
storing the second image in the memory resource;
using a processor resource of the general purpose computer to combine the first image with the second image to form a first combined image by employing differences between the first and second images to enhance the decipherability of the encoded raised character information; and
receiving output of a character recognition operation, the output comprising a set of machine readable characters corresponding to the raised character information encoded in the third dimension of the first surface,
wherein the differences between the first and second images include differences in the raised character information that result from differences between the first set of lighting conditions and the second set of lighting conditions.

2. The method of claim 1 wherein the differences between the first and second images further include shadowing differences resulting from differences between the first set of lighting conditions and the second set of lighting conditions.

3. The method of claim 1 further comprising the acts of:
capturing, also in response to the user request, a third image of the first surface under a third set of lighting conditions; and
using the processor resource to combine the third image with the first combined image to form a second combined image.

4. The method of claim 1 wherein the output of the character recognition operation is based upon the first combined image.

5. The method of claim 3 wherein the output of the character recognition operation is based upon the second combined image.

6. The method of claim 1 wherein the processor resource includes at least one central processing unit (CPU) and at least one graphics processing unit (GPU) and combining the first image with the second image employs both a CPU and a GPU.

7. The method of claim 1 where the first surface includes a credit card and the encoded raised character information includes a credit card number.

8. A non-transitory computer-readable medium comprising one or more instructions that when executed on a processor configure the processor to:
present a user interface providing an option to initiate an image capture;
receive user instruction through the user interface;
in response to the user instruction, capture a plurality of images of a first subject, wherein the first subject comprises a surface having raised character information encoded in features that are substantially perpendicular to the surface; the plurality of images including a first image captured under a first lighting condition, and a second image captured under a second lighting condition;
combine the first image and the second image to form a first combined image by employing differences between the first and second images to enhance the decipherability of the encoded raised character information; and
generate machine readable characters corresponding to the encoded raised character information,
wherein the differences between the first and second images include differences in the raised character information that result from differences between the first set of lighting conditions and the second set of lighting conditions.

9. The non-transitory computer readable medium of claim 8, wherein the processor is associated with a display screen; the first lighting condition is based upon the illumination of a first portion of the display screen; the second lighting condition is based upon the illumination of a second portion of the display screen; and the first portion is not the same as the second portion.

10. The non-transitory computer readable medium of claim 9, wherein the first portion and the second portion are selected to illuminate the subject from different angles.

11. The non-transitory computer readable medium of claim 10, wherein the illumination of the first portion is selected to comprise a first spectral characteristic and the illumination of the second portion is selected to comprise a second spectral characteristic that is different from the first spectral characteristic.

12. The non-transitory computer-readable medium of claim 8 further comprising instructions that when executed on a processor configure the processor to:
submit the first combined image to a character recognition resource;
receive an indication regarding the accuracy of the character recognition resource acting upon the first combined image; and
based upon the received accuracy indication, determine whether to combine a third image with first image and the second image, wherein the third image is captured under a third lighting condition and in response to the same user instruction.

13. The non-transitory computer readable medium of claim 8, wherein the first lighting condition is based upon the use of a flash and the second lighting condition is based upon the absence of a flash.

14. A system comprising:
a memory;
a processing resource for executing instructions stored in the memory, the instructions when executed cause the processing resource to:
capture N images of a first subject in response to a user input, where N is an integer greater than one and wherein the first subject comprises raised character information encoded upon a surface using features substantially perpendicular to the surface;
capture a first image (N=1) of the first subject under a pre-determined set of conditions including a first lighting condition, a first exposure length condition, and a first spectral characteristic condition;
capture a second image (N=2) of the first subject under a pre-determined set of conditions including a second lighting condition, and a second exposure length condition; and
generating a machine readable character set based upon a first combination of images, wherein the first combination of images represents the combination of at least the first image and the second image by employing differences between the first and second images to enhance the decipherability of the encoded raised character information,
wherein the differences between the first and second images include differences in the raised character information that result from differences between the first set of lighting conditions and the second set of lighting conditions.

15. The system of claim 14 further comprising:
a display screen for displaying a user interface through which the first user input is received; and
a wireless connection to the Internet.

16. The system of claim 15 wherein the processing resource is for executing further instructions stored in the memory, the further instructions when executed cause the processing resource to transmit at least a portion of the machine readable character set over the wireless connection.

17. The system of claim 14 wherein the processing resource comprises a CPU and a GPU.

18. The system of claim 14 wherein the first lighting condition is based upon the use of a flash and the second lighting condition is based upon no use of a flash.

19. The system of claim 14 where N is greater than 2 and wherein the first combination of images represents the combination of all N images.

20. A non-transitory machine accessible storage medium having instructions stored thereon, the instructions when executed on a machine, cause the machine to:
receive a user input through a user interface at least partially represented on a display screen that is coupled to a general purpose computer;
in response to the user input, capture a plurality of images of a subject, wherein the subject comprises tangible, raised character information-encoding features substantially perpendicular to a surface of the subject; the plurality of images including at least (i) a first image captured under a first lighting condition, and (ii) a second image captured under a second lighting condition;
combine the first image with the second image to form a first combined image by employing differences between the first and second images to enhance the decipherability of the raised character information encoded in the tangible features of the subject;
cause the first combined image to be analyzed for character recognition; and
receive a set of machine readable characters corresponding to the raised character information encoded in the tangible features substantially perpendicular to the surface of the subject,
wherein the differences between the first and second images include differences in the raised character information that result from differences between the first set of lighting conditions and the second set of lighting conditions.

21. The non-transitory machine accessible storage medium of claim 20 wherein the first image is combined with the second image by division.

22. The non-transitory machine accessible storage medium of claim 20 wherein the first image is combined with the second image by subtraction.

23. The non-transitory machine accessible storage medium of claim 20 having further instructions stored thereon, the further instructions when executed on a machine, cause the machine to:
transmit over a wireless network the first combined image to a service computer; and
receive the set of machine readable characters from the service computer over the wireless network.

24. The non-transitory machine accessible storage medium of claim 20 wherein the subject is a credit card and the tangible features upon the face of the subject are embossed characters on the surface of the credit card.

25. The non-transitory machine accessible storage medium of claim 20 wherein the second lighting condition comprises a lighting condition without any artificial light.

* * * * *